350-269 SR

1/24/78 OR 4,070,099

United States Patent [19]

Swift et al.

[11] 4,070,099

[45] Jan. 24, 1978

[54] FAST SHUTTER MECHANISM FOR HIGH POWER THERMAL RADIATION

[75] Inventors: Roderick D. Swift, Belmont; Alfred R. DeCaprio, Randolph, both of Mass.

[73] Assignee: The United States of America as represented by the Secretary of the Army, Washington, D.C.

[21] Appl. No.: 679,281

[22] Filed: Apr. 22, 1976

[51] Int. Cl.[2] .......... G05D 25/00

[52] U.S. Cl. .......... 350/269; 350/285

[58] Field of Search .......... 350/6, 266, 269, 285, 350/288, 289, 310; 250/230; 354/152, 153, 154; 219/121; 356/85; 331/94.5 D

[56] References Cited

U.S. PATENT DOCUMENTS

| | | | |
|---|---|---|---|
| 3,717,772 | 2/1973 | Engman | 350/6 |
| 3,736,402 | 5/1973 | Mefferd et al. | 219/121 L |
| 3,810,691 | 5/1974 | Seiden | 350/310 |
| 3,931,593 | 1/1976 | Marshall | 350/285 X |

FOREIGN PATENT DOCUMENTS

| | | | |
|---|---|---|---|
| 1,910,523 | 9/1970 | Germany | 350/269 |

*Primary Examiner*—F. L. Evans

*Attorney, Agent, or Firm*—William G. Gapcynski; Lawrence A. Neureither; Charles R. Carter

[57] ABSTRACT

A fast, large aperture, electrically actuated shutter mechanism capable of withstanding high power densities. The shutter's ability to withstand high power densities is achieved by making the shutter plate highly reflective on one side and providing cooling means on the opposite side.

1 Claim, 2 Drawing Figures

FAST SHUTTER MECHANISM FOR HIGH POWER THERMAL RADIATION

BACKGROUND OF THE INVENTION

This invention relates to the field of shutters. No shutter mechanism capable of withstanding high power thermal radiation is known. Conventional large aperture shutters are easily damaged by overheating.

SUMMARY OF THE INVENTION

The present invention has provided a fast operating shutter mechanism including a shutter plate being made highly reflective on one side and having cooling means on the opposite side.

This invention may be better understood from the following detailed description taken in conjunction with the accompanying drawing.

DESCRIPTION OF THE PREFERRED EMBODIMENT

Figure 1:
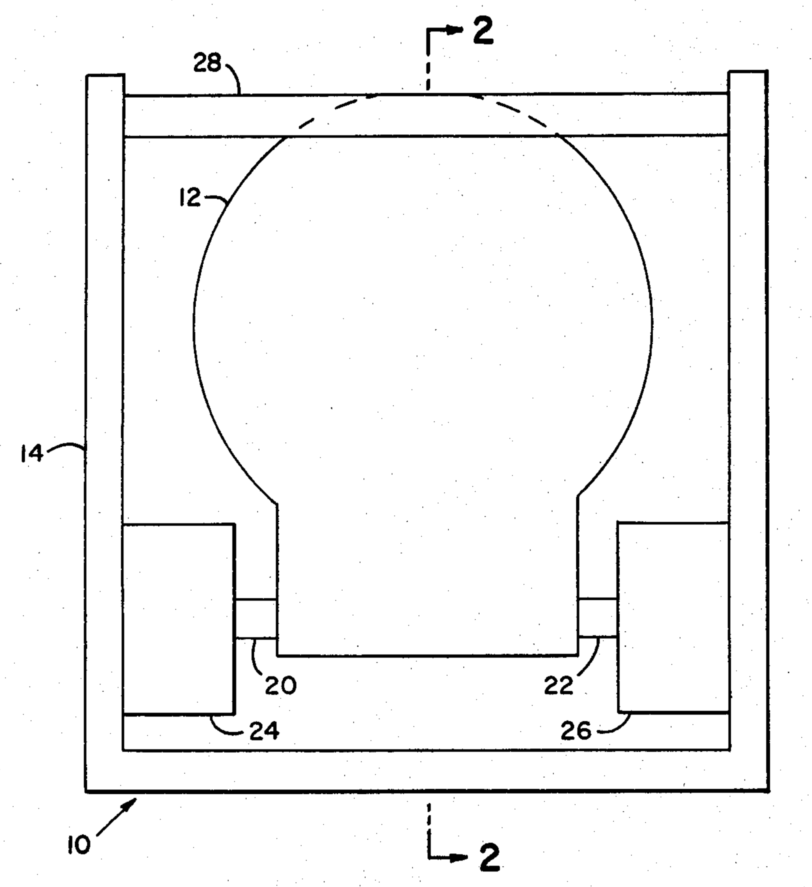
FIG. 1 is an elevation view of the shutter mechanism.

Referring now to the drawing, 10 represents the shutter mechanism having a shutter plate 12 supported by a yoke 14. The shutter plate 12 is a light stopping element made of aluminum or other lightweight material and is made highly reflective by buffing on the input side 16. Alternatively, the plate input side could be coated with an evaporated or electroplated layer of reflective metal. The back side 18 of the shutter plate is blackened to provide a cooling effect on the plate. Forced air circulation or water cooling could be used alternatives. Shafts 20 and 22 are provided to support the shutter plate for rotary movement on the mounting yoke. Shaft 20 is connected to a 90° rotary motion electrical solenoid 24 while shaft 22 is connected to a similar solenoid 26. The solenoids are connected in facing relationship on opposite sides of the mounting yoke. During assembly of the shutter mechanism one of the solenoids is placed in the actuated position while the other solenoid is placed in the normal unactuated position. This assures that the quadrants of the 90° rotary motion of the two solenoids coincide. Two stop bars 28 and 30 are connected to the yoke 14. These stop bars are padded by a conventional resilient material at 32. The padded stops prevent the inertia of the plate from carrying it beyond its designed 90° arc of motion 34, which would result in damage to the solenoids.

For rapid actuation of the plate, it is necessary to make the movement of inertia of the plate as low as possible. Therefore the plate area is minimized and the mass thereof is kept as close as possible to the axis of rotation.

Figure 2:
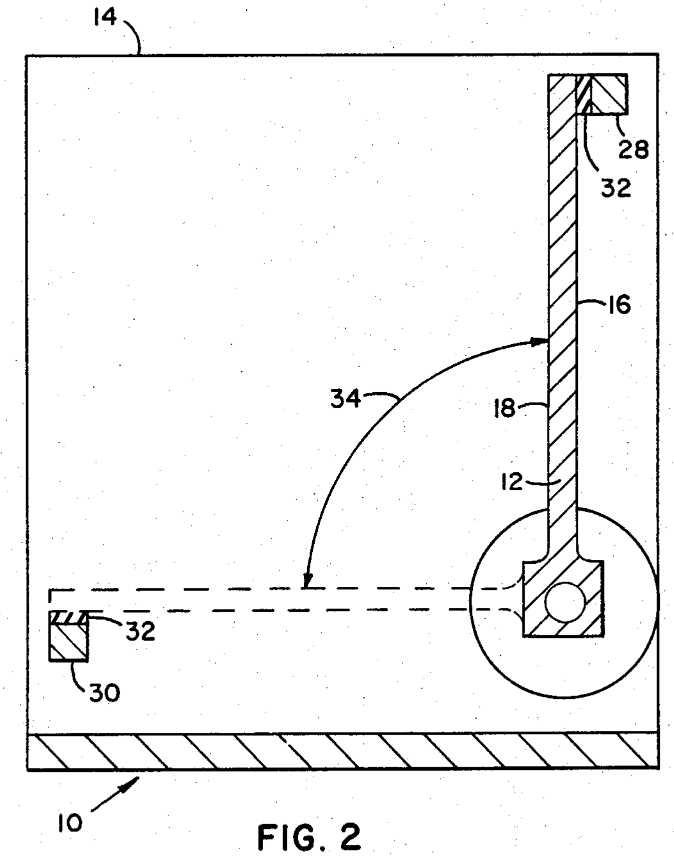
FIG. 2 is a view taken along line 2—2 of FIG. 1.

In operation, the shutter mechanism is used in conjunction with an electronic circuit, not shown. Considering the shutter plate 12 in the closed position as shown by the solid line position in FIG. 2, one of the solenoids, 24 for example, is in the actuated position while the other solenoid 26 is in the unactuated position. To open the shutter, the electronic circuit is operated to actuate solenoid 26 to drive the plate to its dotted line position. Solenoid 24 is unactuated. To close the shutter the circuit is operated to actuate solenoid 24 whereupon the plate and solenoids return to their original positions.

We claim:

1. A shutter mechanism for use in a high power thermal radiation system comprising: a supporting yoke; a pair of rotary motion electrical solenoids connected on opposite sides of said supporting yoke; a shaft connected with each solenoid; a shutter plate carried by said shafts whereby actuation of one of said solenoids cause rotation of the plate in one direction and actuation of the second solenoid causes rotation of the plate in an opposite direction, one side of said shutter plate being highly reflective to withstand high power densities and the opposite side of the plate is blackened for cooling purposes; a plurality of stop bars provided on said supporting yoke to limit rotation and said stop bars being padded by a resilient material for contact with said shutter plate.

* * * * *